US010184391B2

(12) United States Patent
Ekstrom

(10) Patent No.: US 10,184,391 B2
(45) Date of Patent: Jan. 22, 2019

(54) INTERNAL COMBUSTION ENGINE AND A METHOD FOR CONTROLLING SUCH AN INTERNAL COMBUSTION ENGINE

(71) Applicant: VOLVO CAR CORPORATION, Gothenburg (SE)

(72) Inventor: Fredrik Ekstrom, Uddevalla (SE)

(73) Assignee: VOLVO CAR CORPORATION (SE)

( * ) Notice: Subject to any disclaimer, the term of this patent is extended or adjusted under 35 U.S.C. 154(b) by 144 days.

(21) Appl. No.: 15/154,071

(22) Filed: May 13, 2016

(65) Prior Publication Data

US 2016/0341117 A1 Nov. 24, 2016

(30) Foreign Application Priority Data

May 20, 2015 (EP) .................................... 15168314

(51) Int. Cl.
| | |
|---|---|
| F02B 47/02 | (2006.01) |
| F02B 75/02 | (2006.01) |
| F02M 25/03 | (2006.01) |
| F01N 5/02 | (2006.01) |
| F02D 41/00 | (2006.01) |

(Continued)

(52) U.S. Cl.
CPC ................ F02B 47/02 (2013.01); F01K 5/00 (2013.01); F01N 5/02 (2013.01); F02B 75/021 (2013.01); F02D 41/0025 (2013.01); F02M 25/03 (2013.01); F02M 31/068 (2013.01); F02M 31/16 (2013.01); C01B 3/38 (2013.01);

(Continued)

(58) Field of Classification Search
CPC .......... F02B 47/02; F02B 75/021; F01N 5/02; F02M 31/068; F02D 41/0025
See application file for complete search history.

(56) References Cited

U.S. PATENT DOCUMENTS

| | | | |
|---|---|---|---|
| 6,253,745 B1 * | 7/2001 | Prater | ................... F01K 23/065 |
| | | | 123/543 |
| 2012/0060493 A1 | 3/2012 | Matthews et al. | |
| 2013/0318946 A1 * | 12/2013 | Morris | ................... C10L 1/003 |
| | | | 60/273 |

FOREIGN PATENT DOCUMENTS

| | | | |
|---|---|---|---|
| DE | 102004013854 A1 | 10/2005 | |
| EP | 2476879 A1 * | 7/2012 | ............. F01N 3/005 |
| WO | 2015040428 A1 | 3/2015 | |

OTHER PUBLICATIONS

Extended European Search Report dated Nov. 4, 2015, Application No. 15168314.1-1606, Applicant Volvo Car Corporation, 5 Pages.

* cited by examiner

*Primary Examiner* — Jacob Amick
*Assistant Examiner* — Charles Brauch
(74) *Attorney, Agent, or Firm* — Brooks Kushman P.C.

(57) ABSTRACT

The disclosure relates to a method for operating an internal combustion engine in a six-stroke mode, wherein the engine comprises at least one cylinder with a reciprocating piston, each cylinder having at least one inlet and outlet valve. The method involves performing a first stroke where a gas comprising at least air is induced into a combustion chamber from an intake conduit; a second stroke where the gas and injected fuel is compressed; a third stroke where the compressed fuel/gas mixture is expanded following an ignition; a fourth stroke where combusted exhaust gas is expelled through a catalyst body into a first exhaust conduit; a fifth stroke where pressurized fuel and pressurized heated water is injected into the combustion chamber to be expanded; and a sixth stroke where steam and gaseous fuel mixture is expelled through the catalyst body into a second exhaust conduit.

18 Claims, 6 Drawing Sheets

(51) Int. Cl.
    *F02M 31/06*      (2006.01)
    *F02M 31/16*      (2006.01)
    *F01K 5/00*       (2006.01)
    *C01B 3/38*       (2006.01)

(52) U.S. Cl.
    CPC ..... *C01B 2203/0233* (2013.01); *Y02P 20/129* (2015.11); *Y02T 10/121* (2013.01); *Y02T 10/126* (2013.01)

INTERNAL COMBUSTION ENGINE AND A METHOD FOR CONTROLLING SUCH AN INTERNAL COMBUSTION ENGINE

CROSS-REFERENCE TO RELATED APPLICATIONS

This application claims foreign priority benefits under 35 U.S.C. § 119(a)-(d) to European patent application number EP 15168314.1, filed May 20, 2015, which is incorporated by reference in its entirety.

TECHNICAL FIELD

The disclosure relates to an internal combustion engine and a method for operating such an internal combustion engine in a six-stroke mode.

BACKGROUND

Conventional motor vehicles using internal combustion engines are operated using a four-stroke cycle, also termed Otto cycle. One problem with internal combustion engines is the low thermal efficiency of the Otto cycle. Thermal efficiency is defined as the useful work output of an engine divided by the fuel consumed at its lower heating value. The peak thermal efficiency for a spark-ignited (SI) engine may be 32% in an automotive application, but the thermal efficiency of the same engine at its normal operating point may be only 15 to 20% or lower. In the 20% thermal efficiency case, 80% of the heat energy in the fuel is discarded as waste heat and is not converted to useful work. In a conventional engine, this heat is lost through the exhaust and through the cooling system, whether the engine is air cooled or liquid cooled. Friction inside the engine also accounts for 10 to 25% of the gross work output from the engine. This friction ends up as heat exiting the engine, so this friction is already included in the peak efficiency figures given. There are ways of increasing the thermal efficiency of an engine. In order to improve the thermal efficiency of internal combustion engines it has been suggested that the use of a six-stroke cycle would be advantageous to use some of the waste heat normally expelled in the exhaust.

For instance, US2012/0060493 discloses a six-stroke engine where water is injected into the cylinder after the exhaust stroke and is instantly turned to steam, which expands and forces the piston down for an additional power stroke. Thus, waste heat that requires an air or water cooling system to discharge in most engines is captured and put to use driving the piston. Hence the need for a cooling system can at least be reduced, if not eliminated. The weight associated with a cooling system could be eliminated, but that would be balanced by a need for a water tank in addition to the normal fuel tank.

Although known solutions can extract additional power from the expansion of steam and improve the fuel consumption of a conventional four-stroke engine, there is a need for further improving the thermal efficiency of internal combustion engines.

An object of the disclosure is to provide an internal combustion engine and a method for operating such an internal combustion engine in a six-stroke mode in order to improve the thermal efficiency of the engine.

SUMMARY

An object of the disclosure is to provide an internal combustion engine and a method for operating such an internal combustion engine in a six-stroke mode. The object is achieved by a method according to the appended claims.

According to one embodiment, the disclosure relates to a method for operating an internal combustion engine in a six-stroke mode. The engine comprises at least one cylinder with a reciprocating piston, each cylinder having at least one inlet and outlet valve wherein the method involves performing the following steps, in sequence;

a first stroke where a gas comprising at least air is induced into a combustion chamber from an intake conduit;

a second stroke where the gas and injected fuel is compressed;

a third stroke where the compressed fuel/gas mixture is expanded following an ignition;

a fourth stroke where combusted exhaust gas is expelled through a catalyst body into a first exhaust conduit;

a fifth stroke where pressurized fuel and pressurized heated water is injected into the combustion chamber to be expanded; and a sixth stroke where steam and gaseous fuel mixture is expelled through the catalyst body into a second exhaust conduit.

As indicated above, the engine is operated as a conventional four-stroke engine up to and including the fourth stroke. During this stroke the hot exhaust gas is expelled through a catalyst body which is heated to a temperature near or substantially equal to the temperature of the exhaust gas. After passing through the catalyst body the exhaust gas is directed into a first exhaust conduit, which comprises a suitable exhaust after-treatment system (EATS), and subsequently into the ambient air. During the fifth stroke, pressurized water and fuel is injected into the combustion chamber. The water, and alternatively also the fuel, is heated and is subsequently injected into the combustion chamber to provide a relatively high cylinder pressure of around 10-15 bar.

The fifth stroke is driven by the water injected into the cylinder at high pressure and high temperature to form steam. The pressure level of 10-15 bar in the cylinder at top dead center (TDC) is selected in order to avoid a too high pressure at bottom dead center (BDC). However, the water injection pressure can be considerably higher, possibly in the range 50-100 bar in order to avoid bubbles forming in the supply rail for water leading up to a steam injector in each cylinder.

The cylinder pressure is determined by the injection timing of the steam injector, i.e., the amount of water per given volume according to the ideal gas law. The fuel is supplied at a pressure required for delivering a given amount of fuel from the fuel pump. The fuel can be heated, but only if this is allowed for reasons of safety or fuel line positioning. Also, it can be advantageous to inject the fuel later during the fifth stroke. The fuel pressure used can be a conventional pressure for direct injection systems, from 50 bar up to several hundred bar. This is possible due to the fact that separate pumps and injectors are used for fuel and water. The amount of injected fuel is controlled by selecting an injector opening time, which time is dependent on the injection pressure.

The water temperature is determined by the known relationship between boiling point and pressure. Hence, for a given amount of heat added in the exhaust heat exchanger the high pressure pump must be controlled to supply water at a pressure and a mass flow rate to ensure that the water temperature is below the boiling point for that pressure. The ratio of fuel and water injected into the cylinder is approximately 1:1, preferably with a small excess of water to ensure complete reformation of the fuel. Water can be injected using injection pressures from 10 bar up to 100 bar, with a suitable limitation of water temperature. When using a water injection pressure in the range 50-100 bar, the temperature in the water rail may be limited to approximately 250°. The amount of injected water is controlled by selecting an injector opening time, which time is dependent on the injection pressure.

Alternatively at least the water can be superheated, wherein the pressure must be sufficient to prevent flash boiling in the conduits prior to injection. Increasing the pressure and temperature of at least the water will increase the thermal efficiency of the steam cycle during the fifth stroke. Once injected, the pressurized, heated water and the fuel will vaporize and initiate an expansion cycle. During expansion the water and fuel is vaporized into a mixture of steam and gaseous fuel. During the expansion, steam and gaseous fuel mixture absorbs further heat from the walls of the combustion chamber. This process allows additional work to be extracted during the expansion stroke and assists in cooling the cylinder walls of the combustion chamber. An effect of this is that the supply of coolant to a cooling jacket surrounding the cylinder can at least be reduced, if not eliminated. A reduction of the cooling requirements for the engine will assist in improving the thermal efficiency of the engine. During the sixth stroke, steam and gaseous fuel mixture is expelled through the catalyst body previously heated by exhaust gas expelled during the fourth stroke. When passing through the heated catalyst body the gaseous fuel will be reformed into hydrogen gas ($H_2$) and a gas comprising oxides of carbon, preferably carbon monoxide (CO). The reformed fuel and the steam are then directed into a second exhaust conduit, separate from the first exhaust conduit.

This process is generally known as steam reforming, or fossil fuel reforming. The process produces hydrogen gas from hydrocarbon fuels such as petrol or diesel, most notably biodiesel due to its efficiency. A catalyst body, or reformer, is the processing device in which steam reacts with the hydrocarbon fuel under high temperature and pressure. Under temperatures ranging from 700-1100° C., a nickel-based catalyst enables the production of carbon monoxide (CO) and hydrogen ($H_2$). However, the disclosure is not limited to the above examples.

A general formula for steam reforming can be expressed as the stoichiometric reaction:

$$C_nH_m + nH_2O \leftrightarrow (n+m/2)H_2 + nCO$$

For alcohol fuels a similar process is used. A typical alcohol fuel is ethanol, for which the steam reforming formula can be expressed as the stoichiometric reaction:

$$C_2H_5OH + H_2O \rightarrow 4H_2 + 2CO$$

A steam reforming formula for methanol decomposition can be expressed as:

$$CH3OH \rightarrow 2H2 + CO$$

An alternative general formula can be expressed as:

$$C_nH_mO_z + (n-z)H_2O \leftrightarrow (n+m/2-z)H_2 + nCO$$

It should be noted that the above formulas are merely listed as examples and the stoichiometric reaction for an engine according to the disclosure will be determined by factors such as the type of fuel and/or the type of catalyst used.

A catalyst body comprising supported noble metal catalysts, such as rhodium (Rh), ruthenium (Ru), platinum (Pt), palladium (Pd), is suitable for steam reforming of ethanol in the temperature range of 600-850° C. Suitable supports can comprise a metal oxide support ($Al_2O_3$, MgO, $TiO_2$) and the noble metal loading can be up to 5%. For low loaded catalysts, Rh was found to be significantly more active and selective towards hydrogen. The catalytic performance of Rh and, particularly Ru, improved significantly at higher loadings, resulting in higher activity and higher hydrogen selectivity. At high loadings, the catalytic activity and selectivity of Ru catalysts is comparable to that of Rh. At 800° C. and a water/ethanol ratio of 3:1, a 5% $Ru/Al_2O_3$ catalyst is able to completely convert ethanol with a hydrogen selectivity above 95%. A common non-noble metal for steam reforming of ethanol is nickel. Nickel based catalysts supported on $Al_2O_3$, MgO, $La_2O_3$, $SiO_2$ and $Y_2O_3$ with additions of Cu, Cr, Zn, Na or K may be used for ethanol reforming reactions. Generally, Ni promotes splitting of the chemical C—C bond whereas additives like Cr, Cu are the active agents for subsequent oxidation to produce CO and $H_2$. The support materials and catalysts listed above are merely non-limiting examples and the disclosure is not restricted to the use of these materials only.

The reformed fuel directed into the second exhaust conduit is collected for subsequent injection and mixing with induced intake air during the first stroke. A tank or reservoir suitable for this purpose can comprise one or more valves, such as a non-return valve between the tank and the second exhaust conduit, and a pressurizing means, such as a pump between an injection valve and the tank. Steam directed into the second exhaust conduit is condensed as the reformed fuel and the steam passes through the second exhaust conduit. Condensed water is returned to a water tank for re-use during subsequent engine operation.

According to the method, the flow of expelled gas/steam between the first and the second conduit can be controlled using a suitable controllable valve, such as a three-way valve. The controllable valve can be switched from a first position, wherein the first exhaust conduit is open and the second exhaust conduit is closed, into a second position, wherein the first exhaust conduit is closed and the second exhaust conduit is open, during the fifth stroke. The controllable valve can subsequently be switched from the second position back to the first position at any time between the start of the first stroke to the end of the third stroke.

As indicated above, the water and the fuel is injected at a relatively high pressures. The pressurization can be achieved using at least one high pressure fuel pump and at least one water pump, depending on the desired supply pressure. Further, the water and/or the fuel can be heated in order to make the expansion during the fifth stroke more efficient. According to one example, heating can be provided using a heat exchanger located in the first exhaust conduit, using the elevated temperature of the exhaust gas expelled during the fourth stroke. In this way, water supplied from a water tank via a high pressure pump can be pre-heated using the exhaust gas expelled during the fourth stroke and injected during the fifth stroke. Similarly, fuel supplied from a fuel tank via a high pressure pump can be pre-heated using the exhaust gas expelled during the fourth stroke and injecting the heated fuel during the fifth stroke. If the heat supplied to the heat exchanger by the exhaust gas is sufficient, the water and, if desired, the fuel can be superheated, that is, heated above their respective boiling points at ambient pressure. This requires the pressure in the respective conduit to be sufficient to prevent flash boiling in the conduits prior to injection during the fifth stroke.

Advantages of the above method include the possibility of extracting additional power from the steam expansion cycle and improving the fuel consumption by using waste heat for heating fuel and water to assist the steam expansion cycle. By reforming a hydrocarbon fuel into a synthesis gas comprising hydrogen, carbon monoxide (and alternatively some carbon dioxide) the heating value, also referred to as calorific value, of the fuel can be increased by 20%. This increased heating value is taken from the waste heat that would otherwise be expelled with the exhaust gas. Further, by using waste heat for performing a fuel reformation process, at least a portion of the hydrocarbon fuel can be replaced by a reformed fuel in subsequent fuel injections or during a cold start.

In addition, the method allows the engine to be operated in a four-stroke mode. This is achieved by maintaining the second exhaust conduit closed, so that exhausted gas is expelled through the first exhaust conduit only. Simultaneously, the water and fuel injection used during the fifth and sixth strokes is inhibited, whereby the engine is operated using the first four strokes and direct injected conventional fuel only. This is an advantage during, for instance, a cold start operation before the engine has reached its normal operating temperature and has achieved a pressurization of the fuel and a pressurization and heating of the water required for the fifth and sixth strokes. Advantageously, to reduce emissions during a cold start the engine could be operated in a four-stroke mode using stored reformed fuel.

The disclosure further relates to an internal combustion engine that is operable in at least a six-stroke mode. The engine comprises at least one cylinder with an intake conduit and an exhaust conduit, each cylinder having a reciprocating piston and at least one inlet and outlet valve. The six-stroke mode comprises:

a first stroke where a gas comprising at least air is arranged to be induced into a combustion chamber from the intake conduit;

a second stroke where the gas and injected fuel is arranged to be compressed;

a third stroke where the compressed fuel/gas mixture is arranged to be expanded following an ignition;

a fourth stroke where combusted exhaust gas is arranged to be expelled;

a fifth stroke where pressurized fuel and pressurized heated water is arranged to be injected into the combustion chamber (24) to be expanded; and a sixth stroke where the steam and gaseous fuel mixture is arranged to be expelled.

According to the disclosure, the exhaust conduit comprises a catalyst body arranged downstream of the outlet valve and upstream of a flow controlling valve. The volume of the catalyst body can fill a portion of, or the entire volume of, the exhaust conduit between the outlet valve and the flow controlling valve. This volume can be selected depending on the available exhaust temperature, the dimensions of the exhaust conduit, the catalytic material used and/or the type of fuel to be reformed. Alternatively, the catalyst volume needed for complete reformation of hydrocarbon fuel may require an enlargement of a conventional exhaust conduit. The flow controlling valve is arranged to direct exhaust gas into a first exhaust conduit during the fourth stroke, and to direct expelled steam and a fuel reformed in the catalyst body into a second exhaust conduit during the sixth stroke. The flow controlling valve can preferably, but not necessarily, be a controllable three-way valve. Non-limiting examples of alternative valves are sliding, rotary or reciprocating valves. The valves can be controlled mechanically, e.g., by an auxiliary camshaft, or by suitable electric or hydraulic means.

The first exhaust conduit can comprise an exhaust heat exchanger arranged to transfer heat from the exhaust expelled during the fourth stroke to the pressurized water and, if desired, the fuel prior to injection during the fifth stroke.

The second exhaust conduit can comprise a condenser arranged to remove steam, by condensing it to water, and a tank or reservoir arranged to collect reformed fuel prior to induction into the combustion chamber. A tank or reservoir suitable for collecting gaseous reformed fuel can comprise one or more valves, such as a non-return valve between the tank and the second exhaust conduit, and a pressurizing means, such as a pump between an injection valve and the tank. Reformed fuel can, for instance, be injected into the intake conduit and be mixed with induced intake air during the first stroke.

The disclosure further relates to a computer program comprising program code means or instructions for performing the method steps as described above for controlling an internal combustion engine when said program is run on a computer. Finally, the disclosure relates to a computer readable medium carrying a computer program comprising program code means for performing the method steps according to any of claims 1-9 for controlling an internal combustion engine when said program product is run on a computer.

The disclosure aims to improve the thermal efficiency of internal combustion engine by making more effective use of waste heat contained in cooling water and exhaust gas, which heat is normally expelled from the engine into the surrounding atmosphere.

BRIEF DESCRIPTION OF THE DRAWINGS

With reference to the appended drawings, below follows a more detailed description of embodiments according to the disclosure cited as examples.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
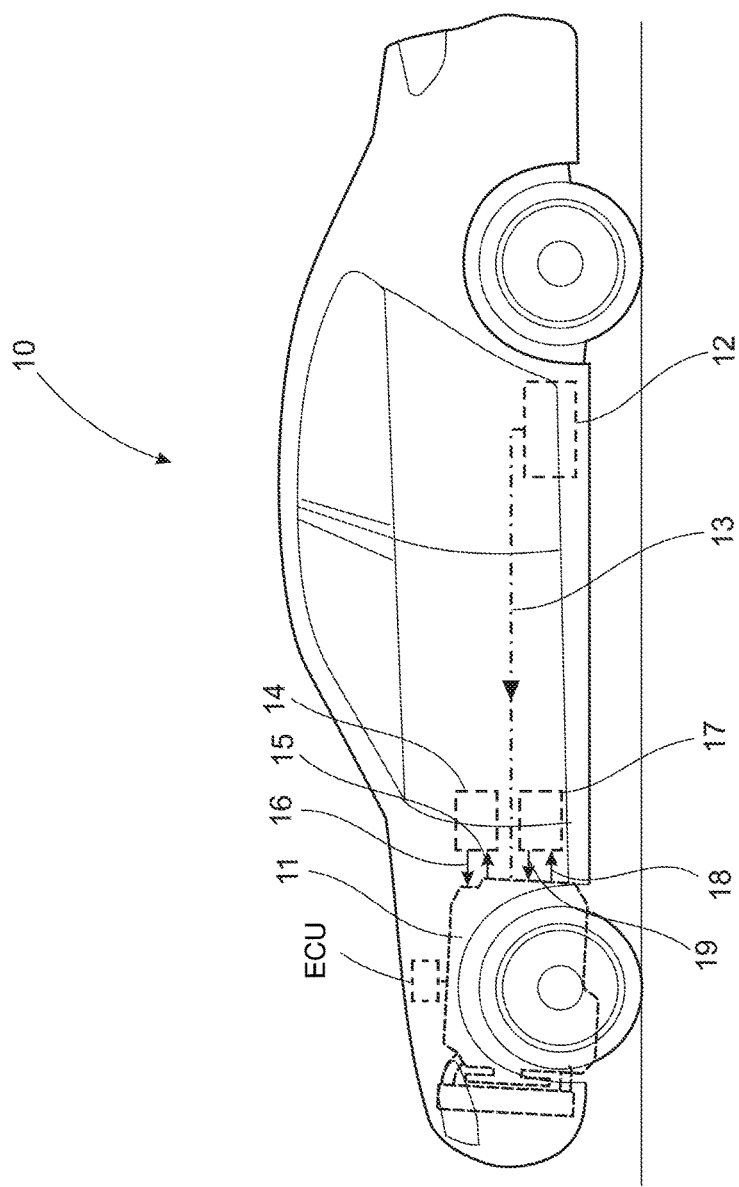
FIG. 1 shows a vehicle comprising an internal combustion engine according to the disclosure.

FIG. 1 shows a schematically indicated vehicle 10 comprising an internal combustion engine 11, which in this example is connected to a transmission (not shown) for driving a pair of front wheels. The vehicle 10 comprises a first fuel tank 12 connected to the engine 11 by a first fuel supply line 13. The engine 11 is further connected to a water tank 14 by a water supply line 15 and a water return line 16. Finally, the engine 11 is connected to a second fuel tank 17 for reformed fuel generated by the engine 11, which connections comprise a fuel collection line 18 and a second fuel supply line 19.

Figure 2:
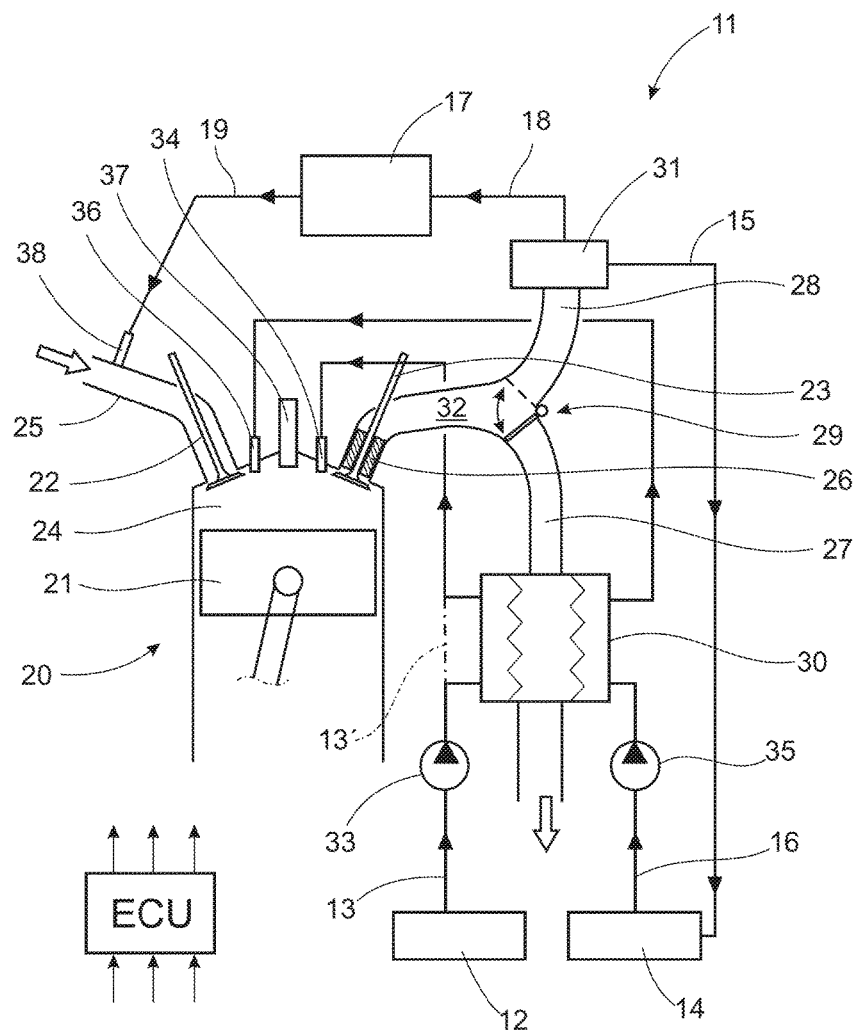
FIG. 2 shows a schematic diagram of an internal combustion engine suitable for performing the method according to the disclosure.

FIG. 2 shows a schematically illustrated internal combustion engine according to the disclosure, which engine 11 is operable in a six-stroke mode. The engine 11 comprises at least one cylinder 20 (one shown) with an intake conduit 25 and an exhaust conduit 32, each cylinder 20 having a reciprocating piston 21 and at least one inlet valve 22, for admitting induced air from the intake conduit 25, and at least one outlet valve 23, for exhausting exhaust gas or other gaseous mixtures into the exhaust conduit 32. Fuel is supplied from a first fuel tank 12 connected to the engine 11 by a first fuel supply line 13 and is pressurized by a first high pressure pump 33 before being supplied to a fuel injector 34 arranged to inject fuel directly into the combustion chamber 24. The pressurized fuel is preferably, but not necessarily, heated by passing it through a heat exchanger 30 heated by exhaust gas from the combustion process. If it is not desired to heat the fuel, a bypass portion 13' of the fuel line 13 is provided. The engine 11 is further connected to a water tank 14 by a water supply line 15. The supplied water is pressurized by a second high pressure pump 35 before being supplied to a water injector 36 arranged to inject water directly into the combustion chamber 24. The pressurized water is heated, preferably superheated, by passing it through the heat exchanger 30 heated by exhaust gas from the combustion process.

The exhaust conduit 32 contains a catalyst body 26 arranged in the exhaust conduit 32 downstream of the outlet valve 23 and upstream of a flow controlling valve 29, wherein the flow controlling valve 29 is arranged to direct combusted exhaust gas into a first exhaust conduit 27 following a combustion and an expansion stroke. Exhaust gas directed from the combustion chamber 24 into the first exhaust conduit 27 following a combustion process will pass through and heat the catalyst body 26. The exhaust gas will then pass through and heat the heat exchanger 30, where after it passes through an exhaust after-treatment system (not shown) and out into the ambient atmosphere.

Note that the catalyst body 26 in FIG. 2 is only schematically indicated. The volume of the catalyst body can fill a portion of, or the entire volume of, the exhaust conduit between the outlet valve and the flow controlling valve. Its volume can be selected depending on the available exhaust temperature, the dimensions of the exhaust conduit, the catalytic material used and/or the type of fuel to be reformed. Alternatively, the catalyst volume needed for complete reformation of hydrocarbon fuel may require an enlargement of a conventional exhaust conduit.

The flow controlling valve 29 is further arranged to direct expelled steam and fuel reformed during the passage through the catalyst body 26 into a second exhaust conduit 28 following a steam expansion stroke. Steam and a reformed fuel directed into the second exhaust conduit 28 following a steam expansion process will pass through a condenser 31. In the condenser 30, steam is condensed back to water and is returned to the water tank 14 through a water return line 15 for re-use. Gaseous reformed fuel generated by the engine 11 will leave the condenser 30 through a fuel collection line 18 connected to a tank 17 or reservoir arranged to collect reformed fuel. The tank or reservoir is adapted for collecting gaseous reformed fuel can comprise one or more valves, such as a non-return valve between the tank and the second exhaust conduit or condenser. Further, a pressurizing means, such as a pump (not shown), can be arranged in the tank to provide pressurized reformed fuel to a second fuel supply line 19 between the tank 17 and a second injection valve 38. Reformed fuel is injected into the intake conduit 25 and is mixed with induced intake air for admission into the combustion chamber 24 during an air intake stroke.

The flow controlling valve 29 in this example is a controllable three-way valve, but any suitable sliding, rotary or reciprocating valve can be used for this purpose.

FIGS. 3A-3F show schematic diagrams of the internal combustion engine in FIG. 2 during each part of a six-stroke cycle. The disclosure involves operating an internal combustion engine in a six-stroke mode. As indicated above, the engine comprises at least one cylinder 20 with a reciprocating piston 21, each cylinder having at least one inlet valve 22 and at least one outlet valve 23. The inventive method involves performing the following steps, in sequence;
  a first stroke where a gas comprising at least air is induced into a combustion chamber 24 from an intake conduit 25;
  a second stroke where the gas and injected fuel is compressed by the piston 21;
  a third stroke where the compressed fuel/gas mixture is expanded following an ignition;
  a fourth stroke where combusted exhaust gas is expelled through a catalyst body 26 into a first exhaust conduit 27;
  a fifth stroke where pressurized fuel and pressurized heated water is injected into the combustion chamber 24 to be expanded; and
  a sixth stroke where steam and gaseous fuel mixture is expelled through the catalyst body (26) into a second exhaust conduit (28).

Figure 3A:
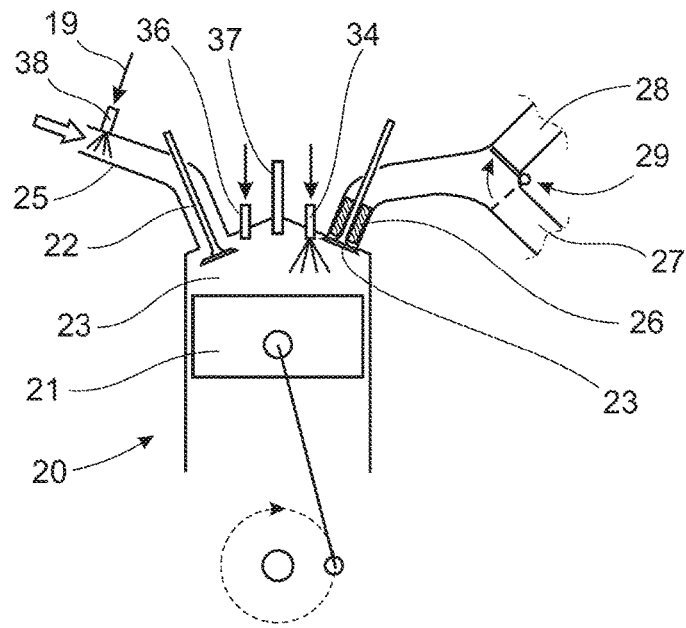
FIGS. 3A-F show schematic diagrams of the internal combustion engine in FIG. 2 during each part of a six-stroke cycle.

In this example, FIG. 3A shows the first stroke wherein intake air is induced from intake conduit 25 and into the combustion chamber 24 through the intake valve 22. At this point in time the exhaust valve 23 is closed. As indicated in FIG. 3A, fuel can be injected directly into the combustion chamber 24 through the first fuel injector 34 during this stroke. Alternatively, or in addition, reformed fuel can be injected into the intake air by the second fuel injector 38 in the intake conduit 25 at this time.

Figure 3B:
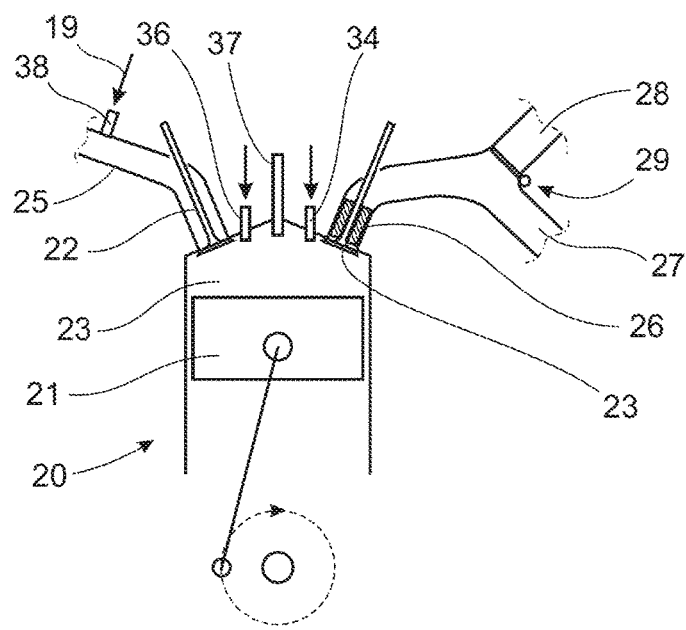

FIG. 3B shows the second stroke where the induced gas, comprising air or air and reformed fuel, and the direct injected fuel are compressed by the piston 21. At this point in time the intake valve 22 and the exhaust valve 23 are closed.

Figure 3C:
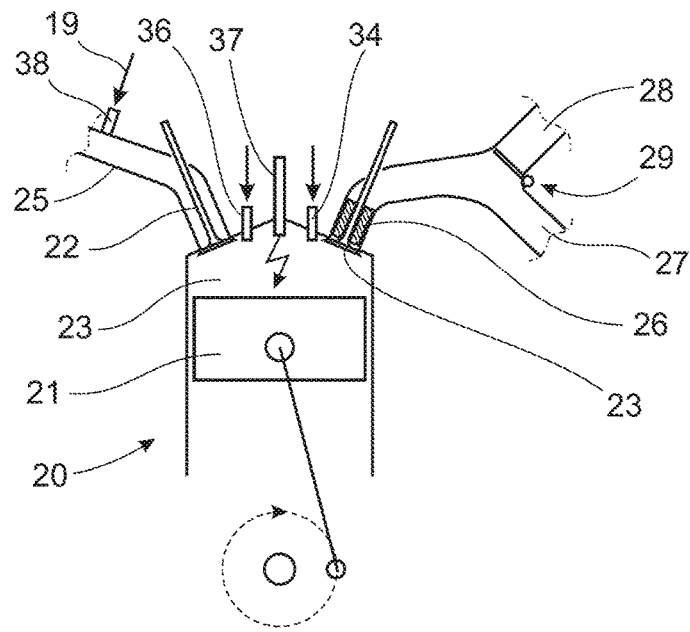

FIG. 3C shows the third stroke where the compressed fuel/gas mixture is expanded following an ignition and a subsequent combustion of the fuel/gas mixture. At this point in time the intake valve 22 and the exhaust valve 23 are closed.

Figure 3D:
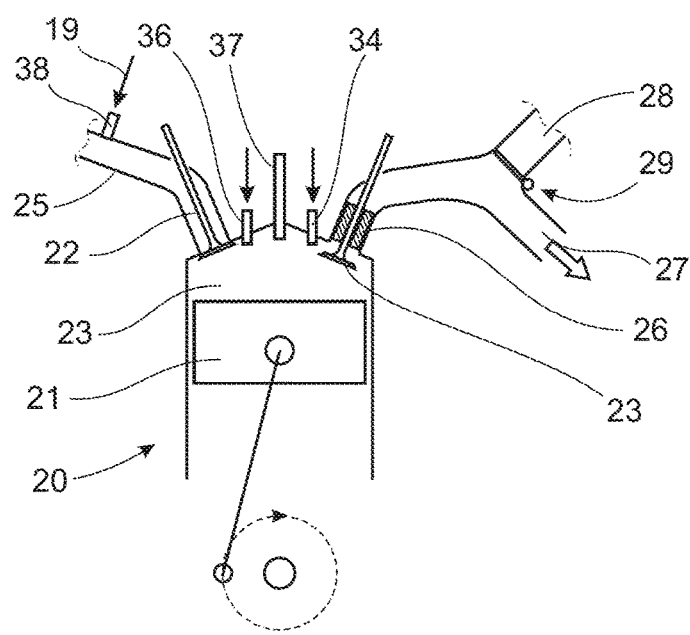

FIG. 3D shows the fourth stroke where combusted exhaust gas is expelled through the catalyst body 26 arranged in the exhaust conduit 32 downstream of the outlet valve 23 and upstream of a flow controlling valve 29. The expelled exhaust gas is thereby used for heating the catalyst body 26. During the fourth stroke the flow controlling valve 29 is arranged in a first position where the expelled exhaust gas is directed into the first exhaust conduit 27 and through a heat exchanger 30 in the first exhaust conduit 27. At this point in time the intake valve 22 is closed and the exhaust valve 23 is open.

Figure 3E:
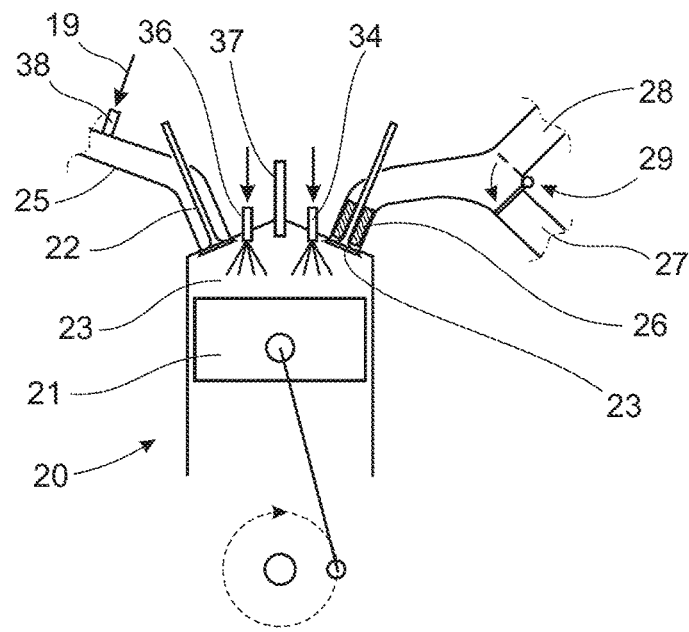

FIG. 3E shows the fifth stroke where pressurized fuel and heated water is injected into the combustion chamber 24 to be expanded in a steam cycle. Pressurized fuel, which can also be heated, is injected directly into the combustion chamber 24 through the first fuel injector 34 during this stroke. Simultaneously, pressurized and preferably superheated water is injected directly into the combustion chamber 24 through the water injector 36. When the pressurized, superheated water is injected into the combustion chamber 24 the water will vaporize into high pressure steam and initiate an expansion cycle. The pressurized injected fuel will contribute to the expansion and will at the same time mix with and be heated by the steam. Additional heat can be absorbed by the fuel/steam mixture contacting the cylinder walls of the combustion chamber. At this point in time the intake valve 22 and the exhaust valve 23 are closed.

Figure 3F:
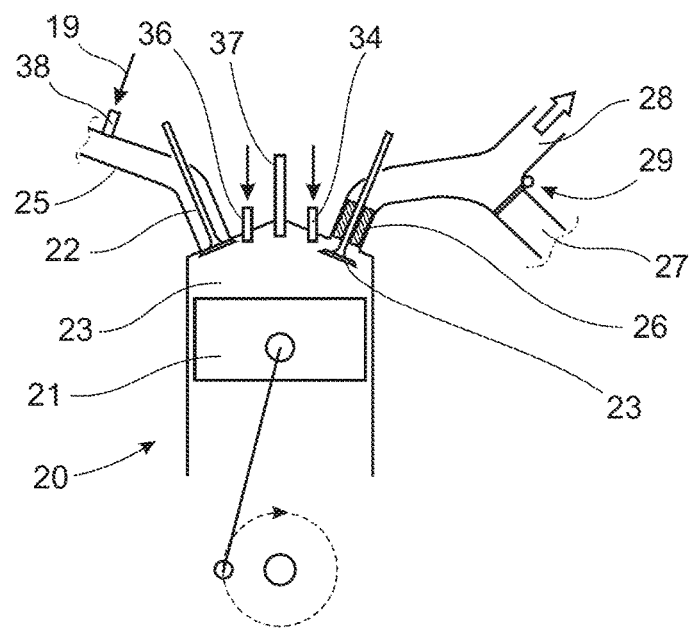

FIG. 3F shows the sixth stroke where the mixture of steam and gaseous fuel is expelled through the catalyst body 26 arranged in the exhaust conduit 32 downstream of the outlet valve 23 and upstream of a flow controlling valve 29. The expelled steam and gaseous fuel mixture is heated by the catalyst body 26 and the fuel is reformed into hydrogen ($H_2$) and oxides of carbon ($CO/CO_2$) when contacting the catalyst. During the sixth stroke the flow controlling valve 29 is arranged in a second position where the expelled exhaust gas is directed into the second exhaust conduit 28. In the second exhaust conduit 28 the expelled steam is condensed and removed, while the reformed fuel collected in a tank for subsequent mixing with induced intake air. At this point in time the intake valve 22 is closed and the exhaust valve 23 is open.

Figure 4:
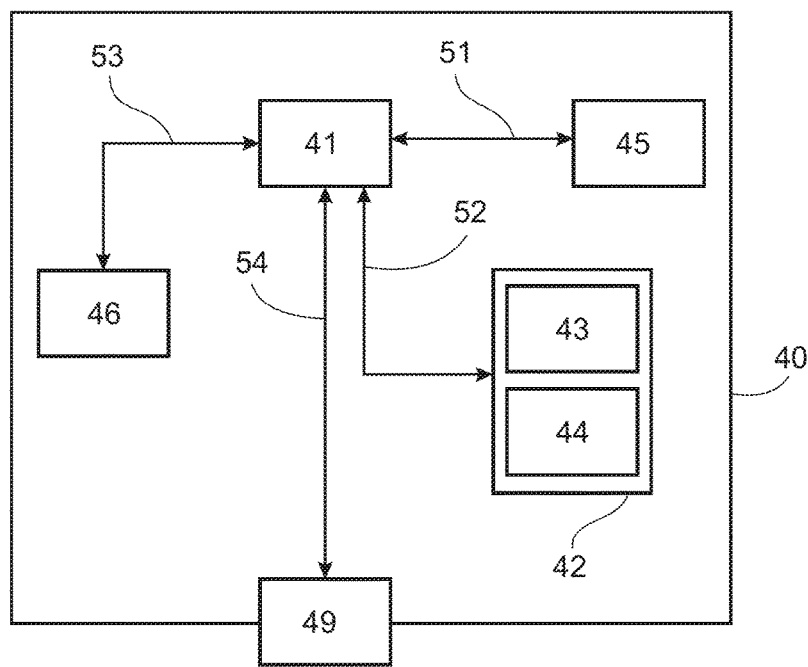
FIG. 4 shows a schematic diagram of the disclosure applied on a computer arrangement.

FIG. 4 shows an apparatus 40 according to one embodiment of the disclosure, comprising a non-volatile memory 42, a processor 41 and a read and write memory 46. The memory 42 has a first memory part 43, in which a computer program for controlling the apparatus 40 is stored. The computer program in the memory part 43 for controlling the apparatus 40 can be an operating system.

The apparatus 40 can be enclosed in, for example, a control unit, such as electronic control unit ECU in FIG. 1. The data-processing unit 41 can comprise, for example, a microcomputer. The memory 42 also has a second memory part 44, in which a program for controlling the target gear selection function according to the disclosure is stored. In an alternative embodiment, the program for controlling the transmission is stored in a separate non-volatile storage medium 45 for data, such as, a CD or an exchangeable semiconductor memory. The program can be stored in an executable form or in a compressed state. When it is stated below that the data-processing unit 41 runs a specific function, it should be clear that the data-processing unit 41 is running a specific part of the program stored in the memory 44 or a specific part of the program stored in the non-volatile storage medium 42.

The data-processing unit 41 is tailored for communication with the storage memory 45 through a first data bus 51. The data-processing unit 41 is also tailored for communication with the memory 42 through a second data bus 52. In addition, the data-processing unit 41 is tailored for communication with the memory 46 through a third data bus 53. The data-processing unit 41 is also tailored for communication with a data port 49 by the use of a fourth data bus 54.

The method according to the present disclosure can be executed by the data-processing unit 41, by the data-processing unit 41 running the program stored in the memory 44 or the program stored in the non-volatile storage medium 45.

It is to be understood that the present disclosure is not limited to the embodiments described above and illustrated in the drawings; rather, the skilled person will recognize that many changes and modifications may be made within the scope of the appended claims.

While exemplary embodiments are described above, it is not intended that these embodiments describe all possible forms according to the invention. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A method for operating an internal combustion engine in a six-stroke mode, wherein the engine includes a cylinder having a reciprocating piston, an inlet valve and an outlet valve, the method comprising the following steps performed in sequence;
   a first stroke where a gas including at least air is induced into a combustion chamber of the cylinder from an intake conduit;
   a second stroke where the gas and injected fuel are compressed;
   a third stroke where the compressed fuel/gas mixture is expanded following an ignition;
   a fourth stroke where combusted exhaust gas is expelled through a catalyst body into a first exhaust conduit;
   a fifth stroke where pressurized fuel and pressurized heated water are injected directly into the combustion chamber to be expanded; and
   a sixth stroke where steam and gaseous fuel mixture is expelled through the catalyst body to be reformed and subsequently directed into a second exhaust conduit.

2. The method according to claim 1 further comprising heating the catalyst body using the exhaust gas expelled during the fourth stroke.

3. The method according to claim 1 wherein a heat exchanger is heated in the first exhaust conduit using the exhaust gas expelled during the fourth stroke.

4. The method according to claim 1 wherein the supplied water is pre-heated using the exhaust gas expelled during the fourth stroke.

5. The method according to claim 1 wherein the fuel supplied during the fifth stroke is pre-heated using the exhaust gas expelled during the fourth stroke.

6. The method according to claim 1 further comprising heating the expelled steam and gaseous fuel mixture using the catalyst body and reforming the fuel into hydrogen and oxides of carbon.

7. The method according to claim 6 wherein the reformed fuel is collected for subsequent mixing with induced intake air.

8. The method according to claim 1 wherein the expelled steam in the second exhaust conduit is condensed.

9. The method according to claim 1 further comprising controlling the flow of expelled gas between the first and the second exhaust conduits using a controllable valve.

10. An internal combustion engine operable in a six-stroke mode, the engine comprising:
    a cylinder having a reciprocating piston and an inlet valve and an outlet valve;
    an intake conduit connected to the cylinder;
    a flow controlling valve; and
    an exhaust conduit connected to the cylinder, the exhaust conduit including a catalyst body arranged downstream of the outlet valve and upstream of the flow controlling valve;
    wherein the six-stroke mode comprises a first stroke where a gas including at least air is inducible into a combustion chamber of the cylinder from the intake conduit, a second stroke where the gas and injected fuel are compressible, a third stroke where the compressed fuel/gas mixture is expandable following an ignition, a fourth stroke where combusted exhaust gas is expellable, a fifth stroke where pressurized fuel and heated water are injectable directly into the combustion chamber to be expanded, and a sixth stroke where the steam and gaseous fuel mixture is expellable through the catalyst body to be reformed, and wherein the flow controlling valve is arranged to direct exhaust gas into a first exhaust conduit connected to the exhaust conduit during the fourth stroke and to direct expelled steam and a reformed fuel from the catalyst body into a second exhaust conduit connected to the exhaust conduit during the sixth stroke.

11. The internal combustion engine according to claim 10 wherein the first exhaust conduit comprises an exhaust heat exchanger arranged to heat the water prior to injection during the fifth stroke.

12. The internal combustion engine according to claim 10 wherein the first exhaust conduit comprises an exhaust heat exchanger arranged to heat the fuel prior to injection during the fifth stroke.

13. The internal combustion engine according to claim 10 wherein the second exhaust conduit comprises a condenser arranged to remove steam and a reservoir arranged to collect reformed fuel prior to induction into the combustion chamber.

14. A non-transitory storage medium comprising computer executable instructions for use in an apparatus for controlling an internal combustion engine that includes at least one cylinder with a reciprocating piston, each cylinder having an inlet valve and an outlet valve, wherein when the instructions are executed the apparatus is operable to control operation of the engine in a six-stroke mode including:

a first stroke where a gas including at least air is induced into a combustion chamber from an intake conduit;

a second stroke where the gas and injected fuel are compressed;

a third stroke where the compressed fuel/gas mixture is expanded following an ignition;

a fourth stroke where combusted exhaust gas is expelled through a catalyst body into a first exhaust conduit;

a fifth stroke where pressurized fuel and pressurized heated water are injected directly into the combustion chamber to be expanded; and a sixth stroke where steam and gaseous fuel mixture is expelled through the catalyst body to be reformed and subsequently directed into a second exhaust conduit.

15. The method according to claim 1 further comprising controlling flow into the first and second exhaust conduits using a controllable valve that is spaced away from the combustion chamber.

16. The method according to claim 15 wherein the fourth stroke involves expelling the combusted exhaust gas through the outlet valve, which is located adjacent the combustion chamber, and into an exhaust conduit, and wherein the controllable valve is arranged in a first position to cause the combusted exhaust gas to flow from the exhaust conduit into the first exhaust conduit.

17. The method according to claim 16 wherein the sixth stroke involves expelling the steam and gaseous fuel mixture through the outlet valve and into the exhaust conduit, and wherein the controllable valve is arranged in a second position to cause the mixture to flow from the exhaust conduit into the second exhaust conduit.

18. The method according to claim 1 wherein the outlet valve is open during the fourth and sixth strokes, and closed during the fifth stroke.

* * * * *